(12) United States Patent
Yoon

(10) Patent No.: US 6,724,459 B2
(45) Date of Patent: Apr. 20, 2004

(54) REFLECTIVE LIQUID CRYSTAL DISPLAY DEVICE HAVING CHOLESTERIC LIQUID CRYSTAL COLOR FILTER AND METHOD OF FABRICATING THE SAME

(75) Inventor: Sunghoe Yoon, Anyang-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 257 days.

(21) Appl. No.: 09/893,452

(22) Filed: Jun. 29, 2001

(65) Prior Publication Data

US 2002/0051105 A1 May 2, 2002

(30) Foreign Application Priority Data

Oct. 25, 2000 (KR) .................... P2000-62803

(51) Int. Cl.[7] .................. G02F 1/1335; G02F 1/13; G02F 1/1337
(52) U.S. Cl. .................. 349/191; 349/175; 349/115; 349/98
(58) Field of Search ................. 349/175, 115, 349/191, 98, 13

(56) References Cited

U.S. PATENT DOCUMENTS

| 4,032,218 A | * 6/1977 | Scheffer ............ 349/115 |
| 5,457,554 A | * 10/1995 | Faris ............ 349/13 |
| 5,555,114 A | * 9/1996 | Narita et al. ........ 349/98 |

FOREIGN PATENT DOCUMENTS

| EP | 4782299 A2 | * 4/1992 |
| JP | 362184055 A | * 8/1987 |
| JP | 410282324 A | * 10/1998 |
| JP | 411084361 | * 3/1999 |

* cited by examiner

Primary Examiner—Julie-Huyen L. Ngo
(74) Attorney, Agent, or Firm—McKenna Long & Aldridge

(57) ABSTRACT

A reflective liquid crystal display includes upper and lower substrates that are opposite to and are spaced apart from each other; a liquid crystal layer interposed between the upper and lower substrates; a transparent common electrode on the surface of the upper substrate opposite the lower substrate; a cholesteric liquid crystal (CLC) color filter that selectively reflects and transmits light, the CLC color filter formed over the lower substrate; a transparent pixel electrode on the CLC color filter; and a light absorption layer between the lower substrate and the CLC color filter.

21 Claims, 6 Drawing Sheets

REFLECTIVE LIQUID CRYSTAL DISPLAY DEVICE HAVING CHOLESTERIC LIQUID CRYSTAL COLOR FILTER AND METHOD OF FABRICATING THE SAME

CROSS REFERENCE TO RELATED APPLICATIONS

This application claims the benefit of Korean Patent Application No. 2000-62803, filed on Oct. 25, 2000, which is hereby incorporated by reference for all purposes as if fully set forth herein.

BACKGROUND OF THE RELATED ART

1. Field of the Invention

The present invention relates to a liquid crystal display (LCD) device, and more particularly to a reflective LCD device including a cholesteric liquid crystal (CLC) color filter.

2. Description of Related Art

In general, a liquid crystal display (LCD) device employing a thin film transistor (TFT) as a switching element is typically called a thin film transistor-liquid crystal display (a TFT-LCD) device. The TFT-LCD has a great advantage in displaying colored images.

The TFT-LCD is generally comprised of upper and lower substrates and an interposed liquid crystal layer therebetween. The upper and lower substrates are respectively referred to as a color filter substrate and a TFT array substrate. Further, as a light source, the TFT-LCD also includes a backlight device under the lower substrate such that the light from this backlight device passes through the upper and lower substrates and is used for displaying images. However, only about 7% of the light generated from the backlight device pass through the pair of substrates. For this reason, the TFT-LCD device requires a high, initial brightness, and thus electric power consumption by the backlight device increases. A relatively heavy battery is needed to supply a sufficient power to the backlight of such a device.

To solve these problems, a reflective LCD device has been researched and developed. Since the reflective LCD device is operated using ambient light other than an internal light source, such as a backlight device, battery life can be increased resulting in longer use times. Namely, only the drive circuitry that drives the liquid crystal uses the battery power in the reflective TFT-LCD device. Therefore, it is adopted for such application as the notebook computer and PDA (Personal Digital Assistant).

For the reflective LCD device, a reflector or/and a reflective electrode is arranged in a pixel region where the transparent electrode would be formed in a transmissive LCD device. In other words, the reflective LCD device is driven using the light reflected from the reflective electrode or/and the reflector. However, the reflective LCD device is low in brightness due to the fact that the reflective LCD device uses the ambient light and the brightness depends on this ambient light from surroundings. One of the reasons for the low brightness is that the ambient light passes twice through the color filter. Due to the reflection on the reflector, the incident light from the outside passes the color filter and then is reflected from the reflector. Then, it is directed toward the color filter again and used for displaying the images. Therefore, most of the light is absorbed by the color filter, thereby decreasing the brightness.

In order to overcome above-mentioned problem, it is essential to raise the transmittance of the color filter. Further, to get an excellent transmittance, the color filter ought to have low color purity. However, there is a limitation of lowering the color purity.

Accordingly, for greater characteristics (such as brightness) of the reflective LCD device, a cholesteric liquid crystal (CLC) has been developed, which selectively transmits or reflects light while acting as a color filter. If the CLC color filter is used in the reflective LCD device, it is possible to omit the reflector from the reflective LCD device, thereby simplifying the manufacturing process. Furthermore, it has advantages of increasing color purity and contrast ratio.

The CLC has a helical shape and the pitch of the CLC is controllable. Therefore, it is possible that the CLC color filter can selectively transmit and/or reflect light. In other words, as well known, all objects have their intrinsic wavelength, and the color that an observer recognizes is the wavelength of the light reflected from or transmitted through the object. The visible spectrum of light is about 400 nm to 700 nm. The visible light region can be broadly divided into red, green, and blue regions. The wavelength of the red visible light region is about 660 nm, that of green is about 530 nm, and that of blue is about 470 nm. Due to the pitch of the liquid crystal, the CLC color filter can selectively transmit or reflect the light having the intrinsic wavelength of the color corresponding to each pixel thereby clearly displaying the colors of red (R), green (G) and blue (B) with high purity. In order to provide a precise color, a plurality of the CLC color filters can be arranged to display the color more clearly than the conventional color filter. Further, the CLC color filter selectively reflects or transmits the right- or left-handed circularly polarized light. Thus, it can transmit a large amount of light, compared to the conventional color filter.

FIG. 1 is a schematic cross-sectional view illustrating a display area of a reflective liquid crystal display (LCD) device having a cholesteric liquid crystal (CLC) color filter. As shown, a reflective LCD device 50 includes upper and lower substrates 10 and 30 and an interposed liquid crystal layer 20 therebetween. The upper and lower substrates 10 and 30 are a transparent material such as glass. On the surface facing the lower substrate 30, the upper substrate 10 includes a transparent common electrode 12 that induces voltage to the liquid crystal layer 20.

Still referring to FIG. 1, on the surface facing the upper substrate 10, the lower substrate 30 includes an alignment layer 36, a CLC color filter 38 formed on the alignment layer 36, and a transparent pixel electrode 48 for applying voltage to the liquid crystal layer 20 on the CLC color filter 38. On the other surface, the lower substrate 30 includes a light absorption layer 40. The light absorption layer 40 is made of a material that greatly absorbs light to absorb the light passing through the CLC color filter 38.

In the above-mentioned structure of the reflective LCD device 50 shown in FIG. 1, the external ambient light is selectively reflected by or transmitted through the CLC color filter 38 as described before. Some portion of the ambient light passing through the CLC color filter 38 is absorbed by the light absorption layer 40. And some portion of the light having a certain wavelength is reflected by the CLC color filter 38 to display a color. Therefore, a reflector is not required.

FIGS. 2A to 2D are perspective views illustrating manufacturing process steps of the reflective LCD device of FIG. 1.

Referring to FIG. 2A, the alignment layer 36 is formed on the transparent lower substrate 36. The alignment layer 36 is necessary for allowing a cholesteric liquid crystal, which will be formed in a later step, to align in a particular direction relative to the light reflection or transmission. The alignment layer 36 is usually formed of polyimide-based polymer that aligns the liquid crystal in one direction. In general, the polyimide-based polymer has advantages of good adhesiveness to the liquid crystal and provides sufficient liquid crystal alignment.

Now, referring to FIG. 2B, the alignment layer 36 formed on the lower substrate 30 is rubbed in a designated direction.

The rubbing method is generally classified into a method in which the substrate itself is rubbed by a fabric or a rubber including: a method of rubbing an inorganic substance that is formed on the substrate; a method of rubbing a polyimide-based polymer that is formed on the substrate; and a method of rubbing a polymeric material that has a similar chemical structure as the liquid crystal. Here, the method of rubbing a polyimide-based polymer is employed.

FIG. 2C shows a manufacturing step of forming the CLC color filter 38 on the alignment layer 36.

First, the cholesteric liquid crystal (CLC) is coated on the alignment layer 36. Then, an exposure process and a baking process are performed in series. Thereafter, the CLC color filter 38 is finally formed.

FIG. 2D shows a manufacturing step of forming the light absorption layer 40. As shown, the light absorption layer 40 is coated or adhered to the transparent lower substrate 30. A black paint or polymer is usually coated for forming the light absorption layer 40. Further, the black film can be adhered to the lower substrate 30 in order to form the light absorption layer 40.

As described before, the reflective LCD device includes the light absorption layer and the CLC color filter on the alignment layer. The above-mentioned reflective LCD device needs to have the alignment layer for the CLC color filter and the light absorption layer. However, the CLC molecules can be arranged in a self-aligning manner rather than other liquid crystal molecules. Therefore, if the light absorption layer is made of the same material as the alignment layer and acts as the alignment layer, a separate alignment layer can be omitted in the reflective LCD device. Further, since the light absorption layer is formed under the lower substrate in the aforementioned structure of the reflective LCD device, the light passing through the CLC color filter can be reflected by the lower substrate before it is absorbed into the light absorption layer. Accordingly, the quality of the reflective LCD device is deteriorated.

SUMMARY OF THE INVENTION

Accordingly, the present invention is directed to a reflective liquid crystal display (LCD) device having a cholesteric liquid crystal (CLC) color filter, which substantially obviates one or more of problems due to limitations and disadvantages of the related art.

An object of the present invention is to provide a method of fabricating a reflective liquid crystal display device (as well as the reflective liquid crystal display device itself), which decreases manufacturing steps and cost.

Another object of the present invention is to provide a reflective liquid crystal display device having high color purity and an improved contrast ratio.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

In order to achieve the objects, in one aspect, a reflective liquid crystal display includes upper and lower substrates that are opposite to and are spaced apart from each other; a liquid crystal layer interposed between the upper and lower substrates; a transparent common electrode on the surface of the upper substrate opposite the lower substrate; a cholesteric liquid crystal (CLC) color filter that selectively reflects and transmits light, the CLC color filter formed over the lower substrate; a transparent pixel electrode on the CLC color filter; and a light absorption layer between the CLC color filter and the lower substrate.

The upper and lower substrate are made of a transparent glass substrate.

The light absorption layer is formed of one of an organic material and an organic composite, such as polyamic acid, polyimide, acrylate, epoxy, siloxane, ester or styrene-based monomer. Further, the organic material comprises a black-colored additive such as dye, pigment or carbon.

The present invention also provides, in another aspect, a reflective liquid crystal display device, including first and second substrates opposite to and spaced apart from each other; a liquid crystal layer interposed between the first and the second substrates; first transparent electrode for applying voltage to the liquid crystal layer, the first transparent electrode formed on the first substrate; a cholesteric liquid crystal (CLC) color filter that selectively reflects and transmits light, the CLC color filter formed on the the second substrate; second transparent electrode for applying voltage to the liquid crystal layer, the second transparent electrode formed on the CLC color filter; wherein the second substrate acting as a light absorption layer that includes an organic material and a black-colored additive.

The above-mentioned first substrate is a transparent glass.

The organic material is one of polyamic acid, polyimide, acrylate, epoxy, siloxane, ester and styrene-based monomer, and the black-colored additive is one of dye, pigment and carbon.

The present invention also provides, in another aspect, a method of forming a lower substrate for use in a reflective liquid crystal display device, including forming a light absorption layer on a substrate; rubbing the light absorption layer in one direction; forming a cholesteric liquid crystal (CLC) color filter on the light absorption layer; and forming a transparent pixel electrode on the CLC color filter.

The above-mentioned substrate is made of a transparent glass substrate.

The light absorption layer is formed of one of an organic material and an organic composite, such as polyamic acid, polyimide, acrylate, epoxy, siloxane, ester and styrene-based monomer. Further, the organic material comprises a black-colored additive such as dye, pigment and carbon.

The present invention also provides, in another aspect, a method of forming a lower substrate for use in a reflective liquid crystal display device, including preparing a light absorption layer as a substrate; forming a cholesteric liquid crystal (CLC) color filter on the light absorption layer; and forming a transparent pixel electrode on the CLC color filter.

The light absorption layer acting as the substrate is formed of one of an organic material and an organic composite, such as polyamic acid, polyimide, acrylate, epoxy, siloxane, ester and styrene-based monomer. Further, the organic material comprises a black-colored additive such as dye, pigment and carbon.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principles of the invention.

In the drawings.

DETAILED DESCRIPTION OF PREFERRED EMBODIMENTS

Reference will now be made in detail to the preferred embodiments of the invention, examples of which is illustrated in the accompanying drawings.

Figure 3:
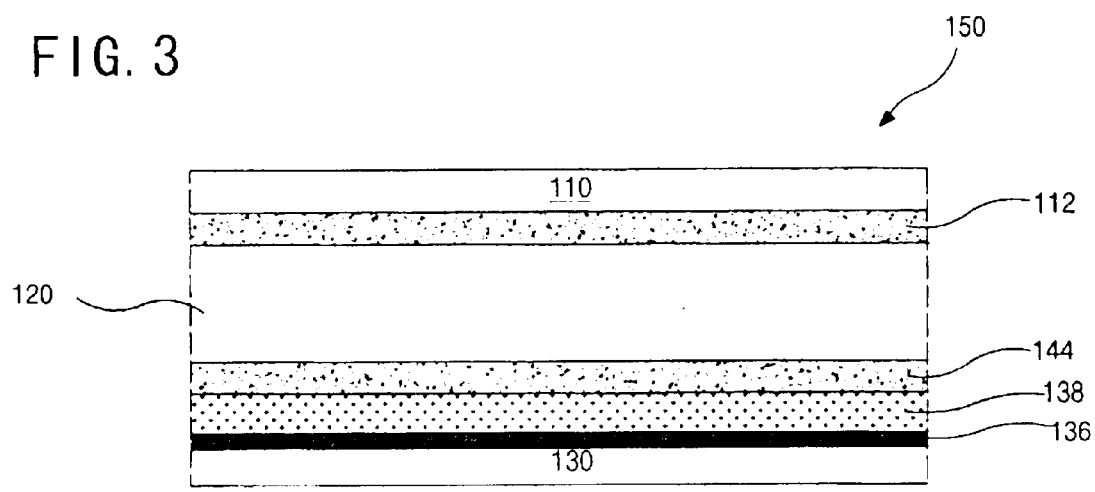
FIG. 3 is a schematic cross-sectional view illustrating a display area of a reflective liquid crystal display (LCD) device having a cholesteric liquid crystal (CLC) color filter according to a first embodiment of the invention.

FIG. 3 is a schematic cross-sectional view illustrating a display area of a reflective liquid crystal display (LCD) device having a cholesteric liquid crystal (CLC) color filter according to a first embodiment of the present invention. As shown, a reflective LCD device 150 includes upper and lower substrates 110 and 130 and an interposed liquid crystal layer 120 therebetween. The upper and lower substrates 110 and 130 are a transparent material such as glass or plastic. On the surface facing the lower substrate 130, the upper substrate 110 includes a first transparent electrode 112 that induces voltage to the liquid crystal layer 120.

Still referring to FIG. 3, on the surface facing the upper substrate 110, the lower substrate 130 includes a light absorption layer 136, a CLC color filter 138 formed on the light absorption layer 136, and a second transparent electrode 144 applying voltage to the liquid crystal layer 120 on the CLC color filter 138.

Figure 1:
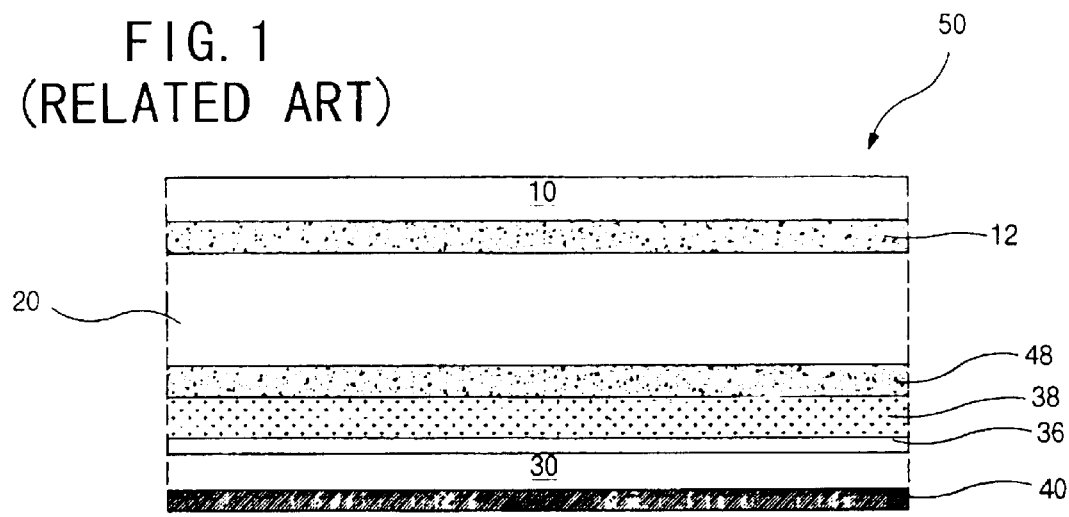
FIG. 1 is a schematic cross-sectional view illustrating a display area of a conventional reflective liquid crystal display (LCD) device having a cholesteric liquid crystal (CLC) color filter.
Figure 2A:
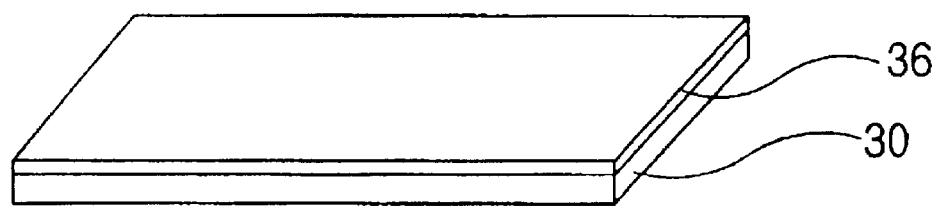
FIGS. 2A to 2D are perspective views illustrating manufacturing process steps of the reflective LCD device of FIG. 1.
Figure 2B:
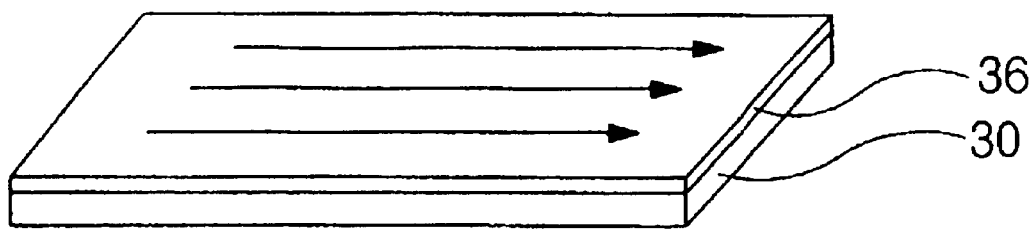
Figure 2C:
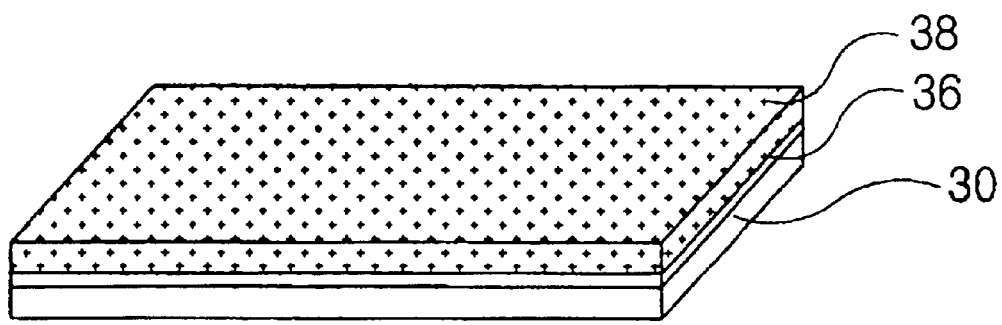
Figure 2D:
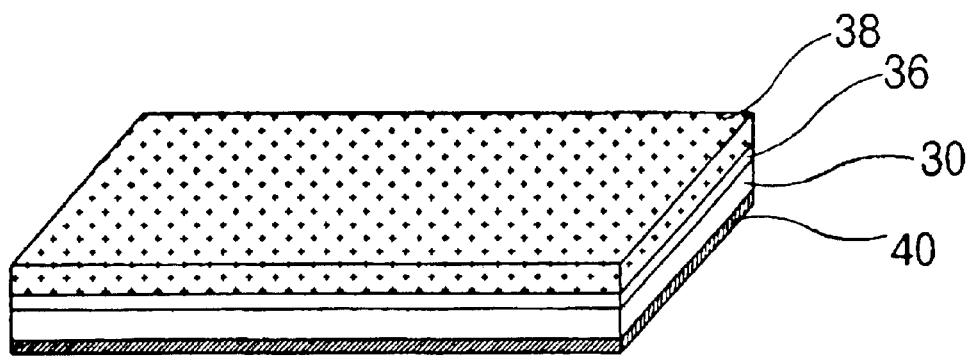

In the structure of the first embodiment of the present invention depicted in FIG. 3, the light absorption layer 136 is arranged between the CLC color filter 138 and the lower substrate 130. Therefore, light passing through the CLC color filter 138 is not reflected by the lower substrate 130 because the light is absorbed by the light absorption layer 136 beforehand. Further, since the light absorption layer 136 acts as an alignment layer and the CLC molecules of the CLC color filter 138 are arranged in a self-aligning manner rather than other liquid crystal molecules, a separate alignment layer for aligning the CLC color filter is not needed, compared to the conventional art depicted in FIG. 1. In the present invention, when forming the CLC color filter 138 on the light absorption layer 136, the CLC color filter 138 is aligned and orientated by applying a shear force to the CLC color filter 138 using coating processes such as knife coating, bar coating and gravure coating.

Figure 4A:
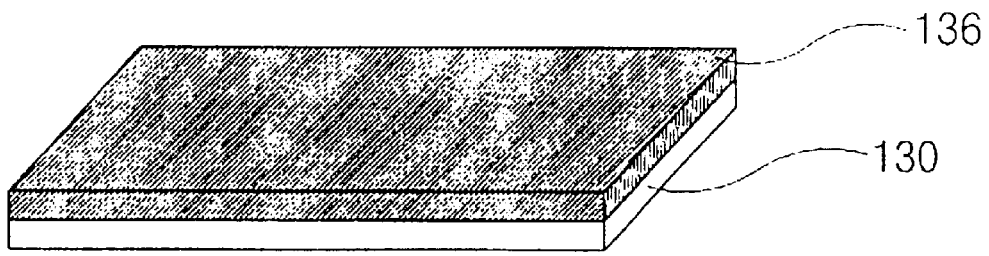
FIGS. 4A to 4C are perspective views illustrating manufacturing process steps of the reflective LCD device of FIG. 3.
Figure 4B:
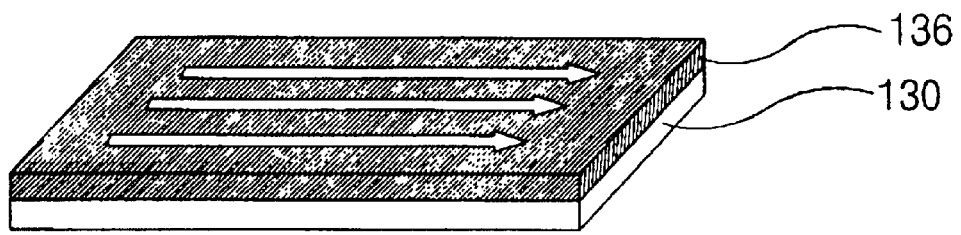
Figure 4C:
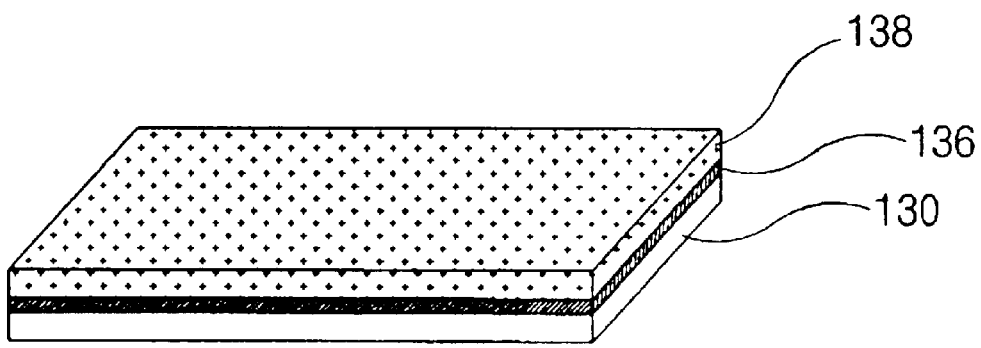

FIGS. 4A to 4C are perspective views illustrating manufacturing process steps of the reflective LCD device of FIG. 3.

FIG. 4A shows a step of forming a light absorption layer 136. As shown, the light absorption layer 136 is formed on the entire surface of the lower substrate 130. The light absorption layer 136 is preferably made of an organic material that includes black-colored additives such as dye, pigment and carbon. Carbon is mainly added to the light absorption layer 136.

Furthermore, the organic material for forming the light absorption layer 136 as described herein means a substance including a monofunctional group or a multifunctional group that has thermal reactivity and photo reactivity. The organic material for the light absorption layer 136 should be fluid-like when coating this material on the lower substrate 130. This organic material, however, should be hardened and be stable. Therefore, in order to match these conditions, the organic material should have a high phase transition temperature or include a cross-linking agent.

A black resin having a black-colored additive for forming the light absorption layer 136 generally comprises polyamic acid and polyimide; acrylate-, epoxy-, siloxane-, ester- or styrene-based monomer itself, or its oligomer or polymer. Also, the black resin having the black-colored additive can comprise the above-mentioned organic composition.

Now, referring to FIG. 4B, the light absorption layer formed on the lower substrate is rubbed in order to act as an alignment layer for a CLC color filter that will be formed in a later step. As shown in FIG. 4B, the light absorption layer 136 is rubbed in a designated direction using the aforementioned rubbing method such as a method using fabric or rubber. As mentioned before, since the CLC is aligned in a self-aligning manner, the light absorption layer 136 is rubbed, to align the CLC color filter instead of an alignment in the conventional art.

FIG. 4C shows a step of forming a CLC color filter on the light absorption layer. Again, the CLC color filter 138 is aligned and orientated by applying a shear force to the CLC color filter 138 using coating processes such as knife coating, bar coating and gravure coating when forming the CLC color filter 138. This shear force applied to the CLC color filter 138 helps the CLC molecules to be properly self-aligned and self-oriented in a designated direction.

As described before, since the CLC color filter 138 and the light absorption layer 136 are adhered to each other, the light reflection caused by the lower substrate is prevented, in contrast to the conventional art. Namely, the light passing through the CLC color filter 138 is prevented from being reflected on the lower substrate 130 because the light is absorbed by the light absorption layer 136. Accordingly, since light not reflected by the CLC color filter 138 is absorbed by the light absorption layer 136, back color is easily displayed in the reflective LCD device.

Figure 5:
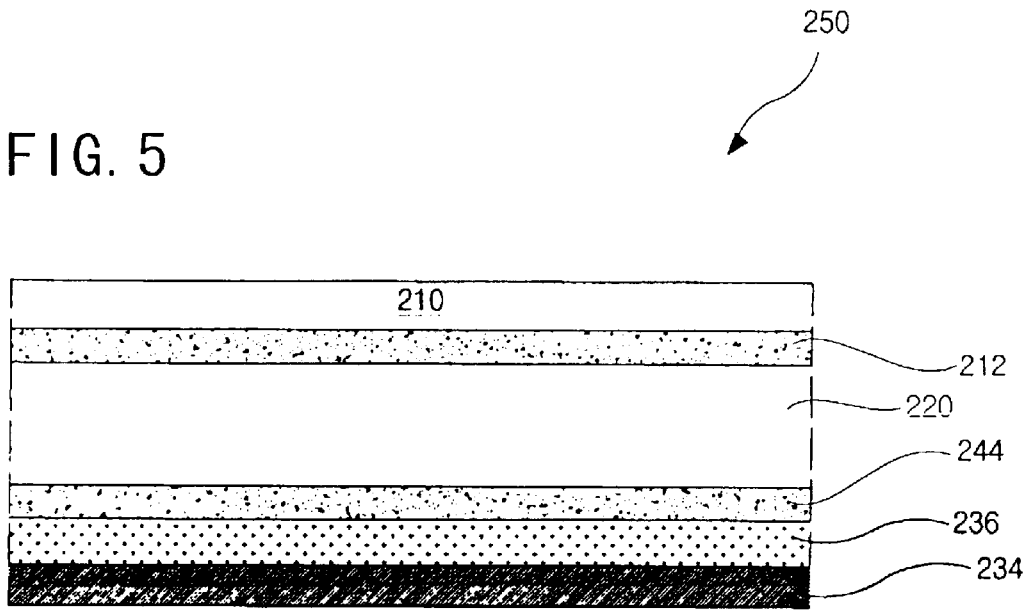
FIG. 5 is a schematic cross-sectional view illustrating a display area of a reflective liquid crystal display (LCD) device having a cholesteric liquid crystal (CLC) color filter according to a second embodiment of the invention.

FIG. 5 is a schematic cross-sectional view illustrating a display area of a reflective liquid crystal display (LCD) device having a cholesteric liquid crystal (CLC) color filter according to a second embodiment of the invention. As shown, although a reflective LCD device 250 has a similar structure to the first embodiment depicted in FIG. 3, it does not include a lower substrate. Namely, a light absorption layer 234 acts as a lower substrate such that it is thicker than the light absorption layer 136 of the first embodiment. In other words, no separate lower substrate is required for the second embodiment. The light absorption layer 234 of the second embodiment is preferably made of the same material as that of the first embodiment, and it is thick enough to function as a lower substrate. Some explanation of the second embodiment will be omitted because this has a similar structure to the first embodiment.

As shown in FIG. 5, a reflective LCD device 250 includes upper and lower substrates 210 and 234 and an interposed liquid crystal layer 220 therebetween. The upper and lower substrates 210 is a transparent material such as glass or plastic and the lower substrate 234 is a light absorption layer. On the surface facing the light absorption layer 234, the upper substrate 210 includes a first transparent electrode 212 that induces voltage to the liquid crystal layer 220.

Still referring to FIG. 5, on the surface facing the upper substrate 210, the lower substrate 234, i.e., the light absorption layer, includes a CLC color filter 236 and a second transparent electrode 244 applying voltage to the liquid crystal layer 220 on the CLC color filter 236.

Figure 6A:
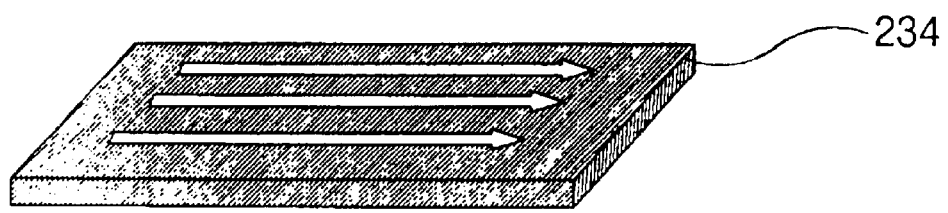
FIGS. 6A and 6B are perspective views illustrating manufacturing process steps of the reflective LCD device of FIG. 5.
Figure 6B:
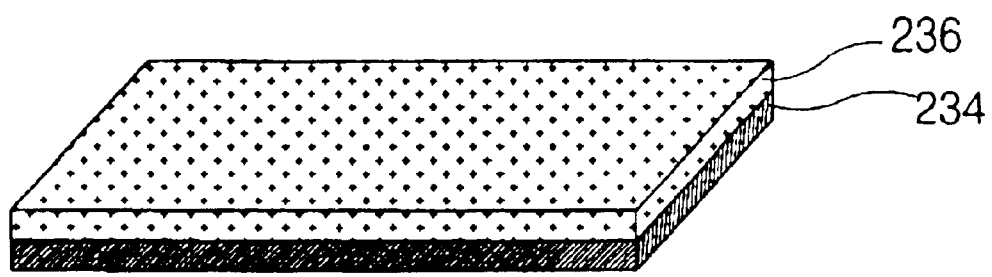

FIGS. 6A and 6B are perspective views illustrating manufacturing process steps of the reflective LCD device of FIG. 5.

FIG. 6A shows a step of rubbing the surface of the light absorption layer 234. As mentioned, the light absorption layer 234 is thick enough to act as a lower substrate and made of the same material as that of first embodiment. Due to the greater thickness, the light absorption layer 234 has a thermal, chemical, mechanical stability. Further, due to the rubbing process, the light absorption layer acts as an alignment layer for the CLC color filter that will be formed thereon in a later step.

FIG. 6B shows a step of forming a CLC color filter 236 on the light absorption layer 234. Again, in the present invention, when forming the CLC color filter 236, the CLC color filter 236 is aligned and orientated by applying a shear force to the CLC color filter 236 using coating processes such as knife coating, bar coating and gravure coating. This shear force applied to the CLC color filter 236 helps the CLC molecules to be properly self-aligned and self-oriented in a designated direction.

As described before, since the CLC color filter 236 acts not only as the alignment layer but also the lower substrate, the manufacturing process and cost are declined.

Accordingly, according to the first embodiment of the present invention, the black resin acting as both the light absorption layer and the alignment layer is formed on the lower substrate. According to the second embodiment of the present invention, the black resin that is thick enough to be the substrate acts as the light absorption layer, the alignment layer and the lower substrate. Therefore, some steps of manufacturing the reflective LCD device can be omitted, thereby decreasing the manufacturing cost.

As described herein, the reflective LCD device according to the first and second preferred embodiments of the present invention has the following advantages.

First, the color purity is greatly improved and the brightness of the light is maximized due to the CLC color filter.

Second, the manufacturing steps and cost are decreased, since the light absorption layer can act as the alignment layer and as both the alignment layer and the substrate.

Third, the reflection from the lower substrate is prevented, since the light absorption layer is formed right under the CLC color filter.

It will be apparent to those skilled in the art that various modification and variations can be made in the present invention without departing from the spirit or scope of the invention. Thus, it is intended that the present invention cover the modifications and variations of this invention provided they come within the scope of the appended claims and their equivalents.

What is claimed is:

1. A reflective liquid crystal display, comprising:
    upper and lower substrates that are opposite to and are spaced apart from each other;
    a liquid crystal layer interposed between the upper and lower substrates;
    a transparent common electrode on the surface of the upper substrate opposite the lower substrate;
    a cholesteric liquid crystal (CLC) color filter that selectively reflects and transmits light, the CLC color filter formed over the lower substrate;
    a transparent pixel electrode on the CLC color filter; and
    a light absorption layer between the CLC color filter and the lower substrate, wherein the light absorption layer aligns cholesteric liquid crystals in the CLC color filter.

2. The reflective liquid crystal display of claim 1, wherein the upper and lower substrate are made of a transparent glass substrate.

3. The reflective liquid crystal display of claim 1, wherein the light absorption layer is formed of one of an organic material and an organic composite.

4. The reflective liquid crystal display of claim 3, wherein the organic material is one of polyamic acid, polyimide, acrylate, epoxy, siloxane, ester and styrene-based monomer.

5. The reflective liquid crystal display of claim 4, wherein the organic material comprises a black-colored additive.

6. The reflective liquid crystal display of claim 5, wherein the black-colored additive is one of dye, pigment and carbon.

7. A reflective liquid crystal display, comprising:
    first and second substrates opposite to and spaced apart from each other;
    a liquid crystal layer interposed between the first and the second substrates;
    a first transparent electrode for applying voltage to the liquid crystal layer, the first transparent electrode formed on the first substrate;
    a cholesteric liquid crystal (CLC) color filter that selectively reflects and transmits light, the CLC color filter formed on the the second substrate;
    a second transparent electrode for applying voltage to the liquid crystal layer, the second transparent electrode formed on the CLC color filter;
    wherein the second substrate acts as a light absorption layer that includes an organic material and a black-colored additive, and wherein the light absorption layer aligns cholesteric liquid crystals in the CLC color filter.

8. The reflective liquid crystal display of claim 7, wherein the first substrate is a transparent glass.

9. The reflective liquid crystal display of claim 7, wherein the organic material is one of polyamic acid, polyimide, acrylate, epoxy, siloxane, ester and styrene-based monomer.

10. The reflective liquid crystal display of claim 7, wherein the black-colored additive is one of dye, pigment and carbon.

11. A method of forming a lower substrate for use in a reflective liquid crystal display device, comprising:

forming a light absorption layer on a substrate;

rubbing the light absorption layer in one direction;

forming a cholesteric liquid crystal (CLC) color filter on the light absorption layer; and forming a transparent pixel electrode on the CLC color filter.

12. The method according to claim 11, wherein the substrate is made of a transparent glass substrate.

13. The method according to claim 11, wherein the light absorption layer is formed of one of an organic material and an organic composite.

14. The method according to claim 13, wherein the organic material is one of polyamic acid, polyimide, acrylate, epoxy, siloxane, ester and styrene-based monomer.

15. The method according to claim 14, wherein the organic material comprises a black-colored additive.

16. The reflective liquid crystal display of claim 15, wherein the black-colored additive is one of dye, pigment and carbon.

17. A method of forming a lower substrate for use in a reflective liquid crystal display device, comprising:

preparing a light absorption layer as a substrate;

rubbing the light absorption layer in one direction;

forming a cholesteric liquid crystal (CLC) color filter on the light absorption layer; and forming a transparent pixel electrode on the CLC color filter.

18. The method according to claim 17, wherein the light absorption layer is formed of one of an organic material and an organic composite.

19. The method according to claim 18, wherein the organic material is one of polyamic acid, polyimide, acrylate, epoxy, siloxane, ester and styrene-based monomer.

20. The method according to claim 19, wherein the organic material comprises a black-colored additive.

21. The reflective liquid crystal display of claim 20, wherein the black-colored additive is one of dye, pigment and carbon.

* * * * *